Figure 1:
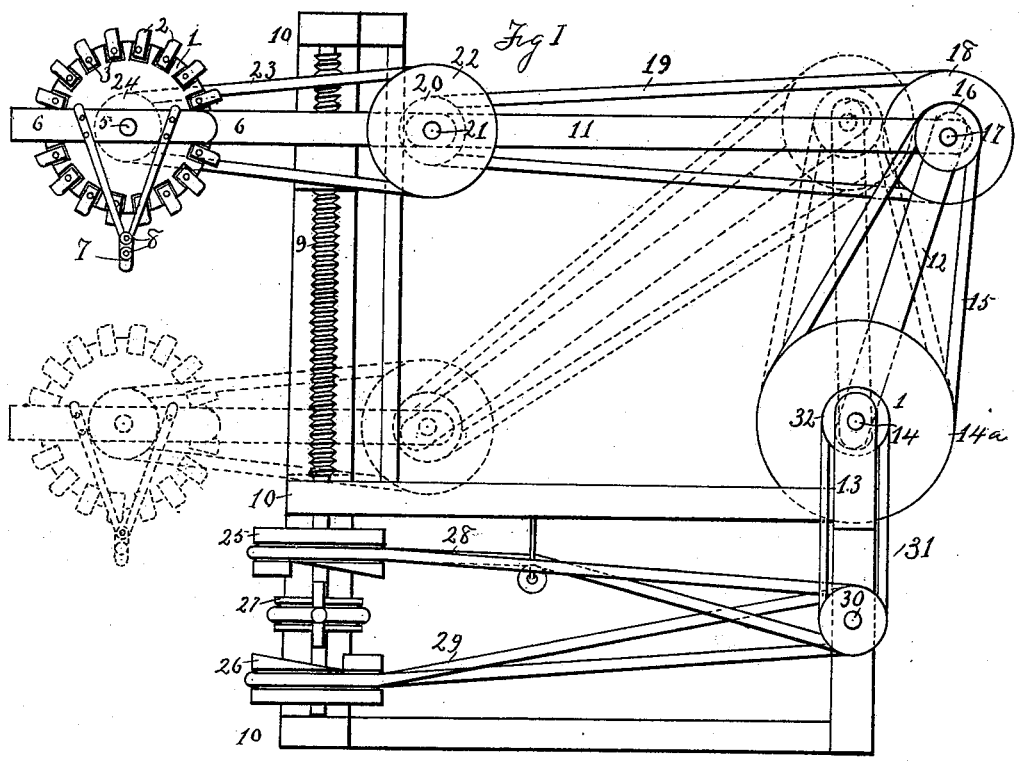
Figure 2:
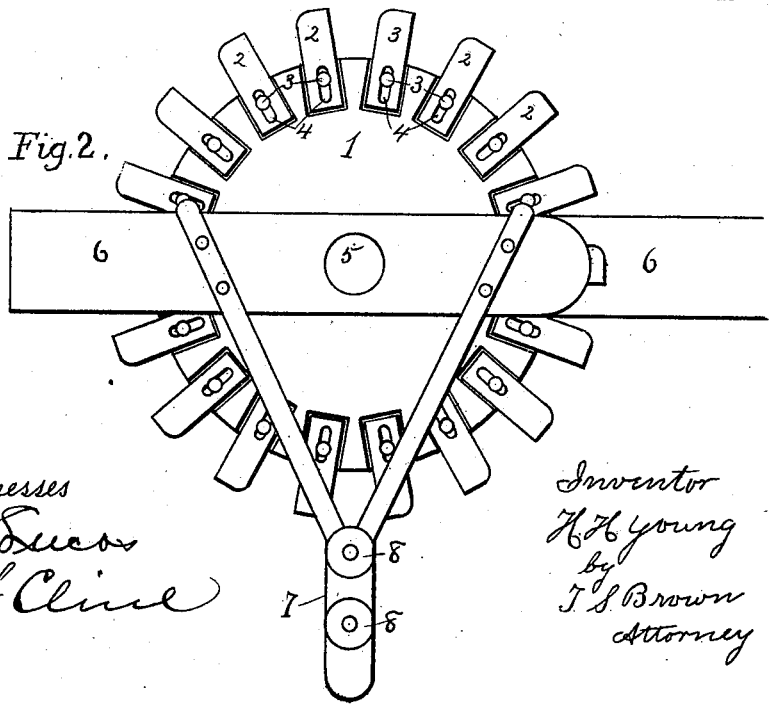

(No Model.) 3 Sheets—Sheet 1.

H. H. YOUNG.
MACHINE FOR SPLITTING BEEVES.

No. 601,926. Patented Apr. 5, 1898.

Witnesses
O. H. Lucas
A. H. Cline

Inventor
H. H. Young
by
J. S. Brown
Attorney (No Model.) 3 Sheets—Sheet 2.
H. H. YOUNG.
MACHINE FOR SPLITTING BEEVES.
No. 601,926. Patented Apr. 5, 1898.
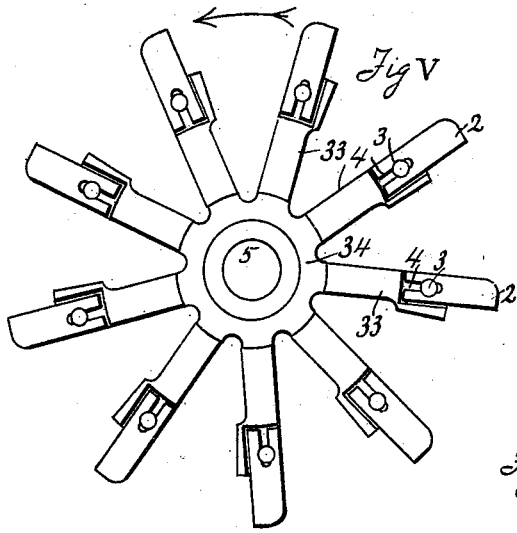
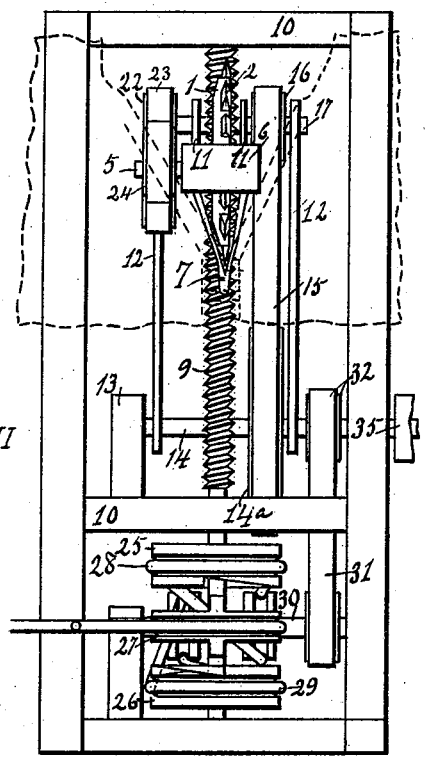
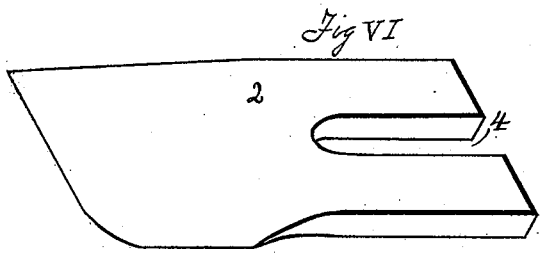
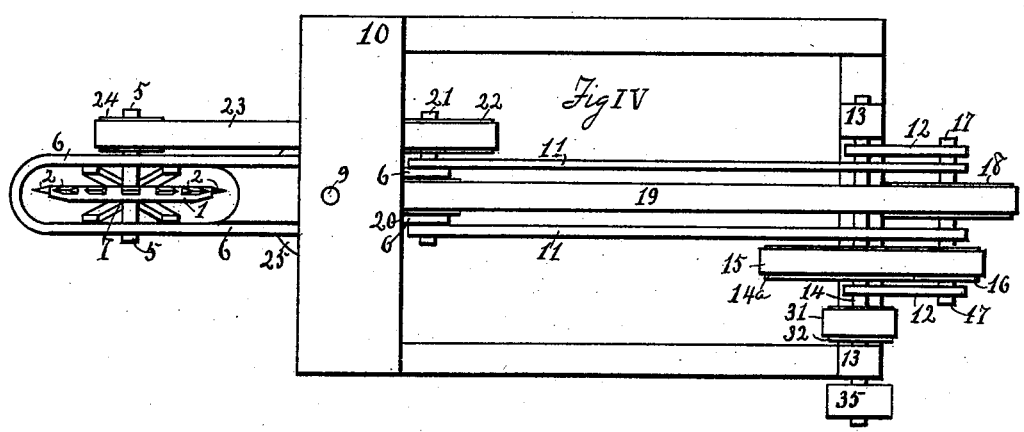
Witnesses
Benj. S. Brown
John M. Parry
Inventor
H. H. Young
by J. S. Brown
Attorney

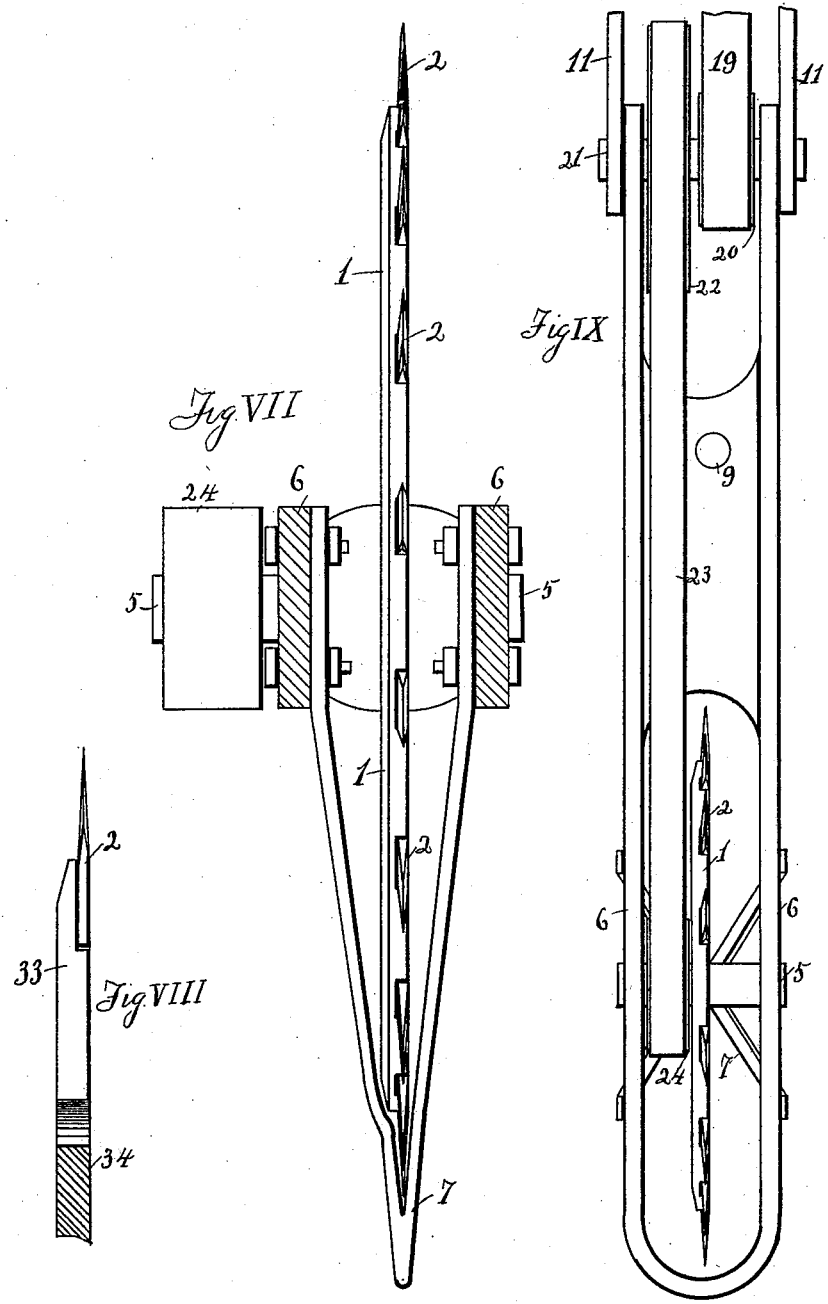

UNITED STATES PATENT OFFICE.

HARLAND H. YOUNG, OF KANSAS CITY, MISSOURI, ASSIGNOR OF TWO-THIRDS TO JOHN W. SMITH AND WALLACE G. TOWER, OF SAME PLACE.

MACHINE FOR SPLITTING BEEVES.

SPECIFICATION forming part of Letters Patent No. 601,926, dated April 5, 1898.

Application filed July 9, 1897. Serial No. 643,970. (No model.)

*To all whom it may concern:*

Be it known that I, HARLAND H. YOUNG, a citizen of the United States, residing at Kansas City, in the county of Jackson, in the State of Missouri, have invented certain new and useful Improvements in Machines for Splitting Beeves, of which the following is a full, clear, and exact description, reference being had to the accompanying drawings, which form a part of this specification.

My invention relates to certain new and useful improvements in machines for splitting beeves of that class designed to follow and split down longitudinally through the backbone of the beef when hung up on the gambrel. The present practice is when the carcass is hung up on the gambrel to split it longitudinally down through the backbone as nearly along the line of the center as may conveniently be done either by means of a cleaver in the hands of a workman or by sawing either with a straight or circular saw operated by hand or by machinery. The use of the cleaver in the hands of a workman involves great labor and in operation is slow and not at all adapted to the requirements of the large operations of the great slaughter and packing houses of the country. Its advantage is that it is clean, makes a clean cut through the flesh and bone, and leaves the meat clean and free from bone-dust or chips, torn shreds of flesh, and deleterious juices. The use of a saw in any form is subject to serious objection, which is well recognized by all who have had any experience in the art, to wit: The bone by the action of the saw-teeth is disintegrated, broken up into fine particles or chips, forming a bone sawdust, and the adjoining flesh is torn and abraded by the tearing action of the saw-teeth, and the fine chips or bone-dust, the deleterious juices from the torn and disintegrated spinal cord or marrow of the backbone and torn shreds of flesh are carried and ground into the abraded flesh, in consequence of which the meat quickly becomes tainted and spoiled, to the great annoyance and loss of the operator. The single advantage of the saw is that it may be operated by machinery and is quite expeditious.

The object of my invention is to obviate the objections to both the foregoing methods, to combine the smooth-cut and clean conditions of the cleaver with the expeditious action of the saw, and relieve the meat from the influences which lead to early taint and decay which follow sawing. To accomplish these objects my invention consists in certain features, elements, and combinations of novelty hereinafter described, and pointed out in the claims.

Figure I represents a side elevation of a machine embodying my invention. Fig. II represents a detail view of one arrangement of the cleavers. Fig. III represents an end elevation showing in dotted lines part of a carcass in operative position with relation to the operative parts. Fig. IV represents a plan view. Fig. V represents a detail view of a modified arrangement of the cleavers upon the axis or shaft. Fig. VI represents a detail perspective of one of the cutting-blades or cleavers. Fig. VII represents a detail front elevation of the cleavers and guide-pin. Fig. VIII represents a detail edge view of one of the arms and cleavers shown in Fig. V. Fig. IX represents a detail plan view of the arm carrying the shaft on which the cleavers are mounted, showing preferable mounting of the pulley thereon.

Similar numerals refer to similar parts throughout the several views.

1 represents a disk provided with cutting-blades or cleavers 2, extending beyond its periphery, secured thereto by the bolt 3 and having the slot 4 for adjustment on the disk. Said disk is mounted on the shaft or axis 5, journaled in the arm 6, or, as shown in Fig. V, said cleavers 2 may be secured upon the arms 33, projecting radially from the hub 34, mounted upon the shaft or axis 5, it being apparent that any construction and arrangement by which a series of cleavers is arranged to revolve upon an axis is within the principle of my invention. The arrangement shown in Fig. V gives a lighter construction and a smaller number of cleavers is used. The construction shown in Fig. II is, however, preferable, for the reason that the space between the arms being filled up, forming a solid disk, gives greater strength, while a larger number of cleavers may be carried, and in operation the momentum consequent upon the additional weight is of considerable advantage. Secured upon said arm 6 and extending beyond the cleavers is the bifurcated guide-pin 7, which may be hinged or jointed, as shown at 8 in Fig. II, though in practice the hinge or joint 8 is not absolutely essential, as will appear. This guide-pin 7 is arranged to enter the orifice of and follow the spinal cord down the backbone or vertebral column, sections of which are shown in dotted lines in Fig. III. The cleavers operate within or through the fork of the pin as closely as safely may be to the point of bifurcation. By such arrangement, the guide-pin following the spinal cord directly in advance of the cleavers and the cleavers operating close up within the fork of the pin, the backbone is split down approximately upon the center line thereof, even the long spines of the dorsal vertebræ being neatly and cleanly split longitudinally; and the cut being a clean cut, without chipping or disintegration of the bone and marrow or abrasion of the flesh and consequent dissemination of the acrid juices and bone-dust over and through the adjacent meat, the carcass is left, after cutting, in the best possible condition for preservation for a long time without the taint which so soon follows when this operation is performed, as it is usually done, by sawing, and the cleavers being given a rapid revolution the work is done very expeditiously with all the cleanness and greater accuracy than can be done with a cleaver in the hands of an expert workman. To accomplish this work, the pin 7 and revolving cleavers are given a vertical movement, as follows: Said arm 6 is mounted upon a vertical screw 9, which is journaled in the frame 10. Upon the stem of the screw 9 are loosely mounted the sheaves 25 26, and between them is the clutch 27, arranged to slide upon the stem and to be engaged by one or the other of said sheaves to give direct or reverse motion to the screw or to stand free from both, if so desired. Said sheaves 25 26 are connected by belts 28 29 with sheaves on the shaft 30, journaled in the frame, said belts being crossed to turn said sheaves in opposite directions, so that as one or the other engages the clutch the arm 6 will be raised or lowered by the action of the screw. Upon said shaft 30 is also a sheave or pulley connected by belt 31 with a sheave or pulley 32 on the driving-shaft 14, said driving-shaft being provided with a pulley 35, arranged to be operated from any convenient source of power.

The shaft 5, carrying the cleavers, is operated as follows: 14 is the driving-shaft journaled in the standards 13, mounted upon the frame and having mounted thereon the driving sheave or pulley 14$^a$. Said pulley 14$^a$ is connected by belt 15 with a pulley 16, mounted on a shaft 17, journaled in vertical swinging arms 12, pivoted on shaft 14. Upon said shaft 17 is also mounted the driving-pulley 18, connected by belt 19 with pulley 20, mounted on shaft 21, journaled in arm 6, the arms 11 being horizontal swinging arms pivotally connecting the shafts 21 and 7, said swinging arms 11 and 12 preserving the relation of the driving and driven pulleys to each other and the tension of the belts as the arm 6 moves up and down on the screw. On said shaft 21 is a driving-pulley 22, connected by belt 23 with pulley 24 on shaft 5, so that the cleavers are driven through said belts and pulleys from the driving-shaft 14. Said pulley 24 is preferably mounted, as shown in Fig. IX, adjacent to the disk, it there offering less interference with the carcass as the arm moves down as the cutting progresses.

In operation the cutter is elevated to the position shown in solid lines in Fig. I, and the carcass to be operated upon is hung under the same, the pin 7 is inserted in the orifice of the spinal cord in the backbone, and follows the same as the arm 6 moves down on the screw. Then as the cleavers revolve in the direction indicated by the arrow in Fig. V the backbone is cleft through rapidly and approximately upon the center line, a clean cut being made, as above set forth. As the cutting progresses, the arm 6 and the cleavers are carried down by the action of the screw to the position shown in dotted lines in Fig. I.

It will be observed that the cleavers are placed upon arms or a disk of sufficient diameter to enable them to cut completely longitudinally through the long spines of the dorsal vertebræ.

I am aware that revolving circular saws have been used for this and analogous purposes, and therefore make no claim to a circular or other saw for this or any other purpose; but, to obviate the objectionable features attending the use of a circular or other saw for this purpose.

What I claim as my invention, and desire to secure by Letters Patent, is—

1. In a machine for splitting beeves, the combination with a suitable frame, an arm having a vertical travel on said frame, and means for operating said arm, of a series of revolving cleavers mounted on a shaft journaled on said arm, a bifurcated guide-pin carried on said arm arranged to follow the spinal cord of a carcass suspended under said arm, and means for revolving said cleavers; substantially as set forth.

2. In a machine for splitting beeves, the combination with a suitable frame, a screw mounted vertically upon said frame and means for giving direct and reverse motion to said screw, of an arm arranged to travel on said screw, a series of revolving cleavers mounted on a shaft journaled on said arm, a bifurcated guide-pin carried on said arm arranged to follow the spinal cord of a carcass suspended under said arm, and means for revolving said cleavers; substantially as set forth.

3. In a machine for splitting beeves, the combination with a series of cleavers mounted upon a revolving shaft and an arm upon which said shaft is journaled, of a bifurcated guide-pin carried on said arm and arranged to operate in advance of said cleavers; substantially as set forth.

4. In a machine for splitting beeves, the combination with a suitable frame and an arm arranged to travel vertically in said frame, of a bifurcated guide-finger carried on said arm and arranged to follow the spinal cord of the carcass suspended under said arm; substantially as set forth.

HARLAND H. YOUNG.

Witnesses:
T. H. RIDDLE,
H. K. LEMON.